H. MASCHEK.
VARIABLE SPEED TRANSMISSION GEARING.
APPLICATION FILED MAY 22, 1915.

1,155,597.

Patented Oct. 5, 1915.

3 SHEETS—SHEET 1.

Witnesses

Inventor
H. Maschek
by
Attorneys.

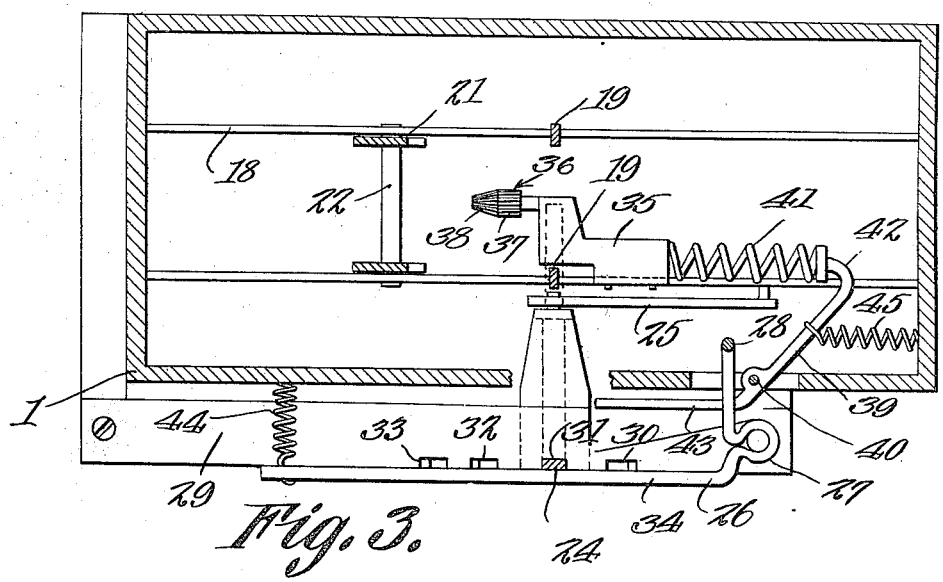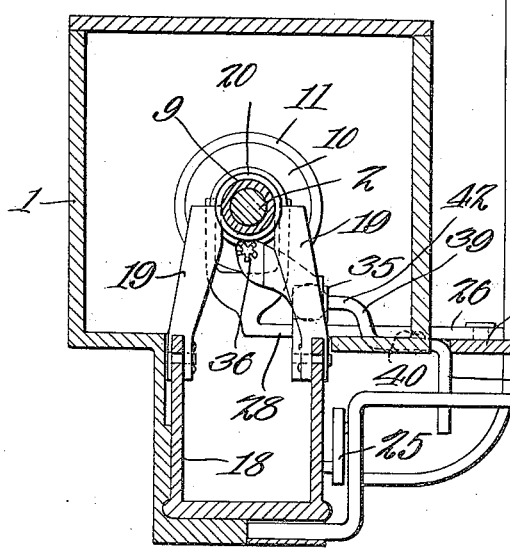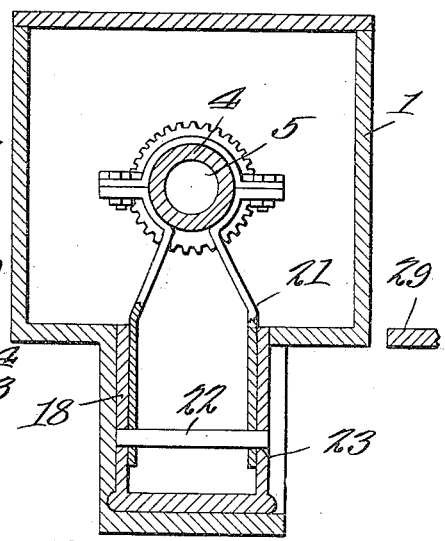

H. MASCHEK.
VARIABLE SPEED TRANSMISSION GEARING.
APPLICATION FILED MAY 22, 1915.
1,155,597.
Patented Oct. 5, 1915.
3 SHEETS—SHEET 3.
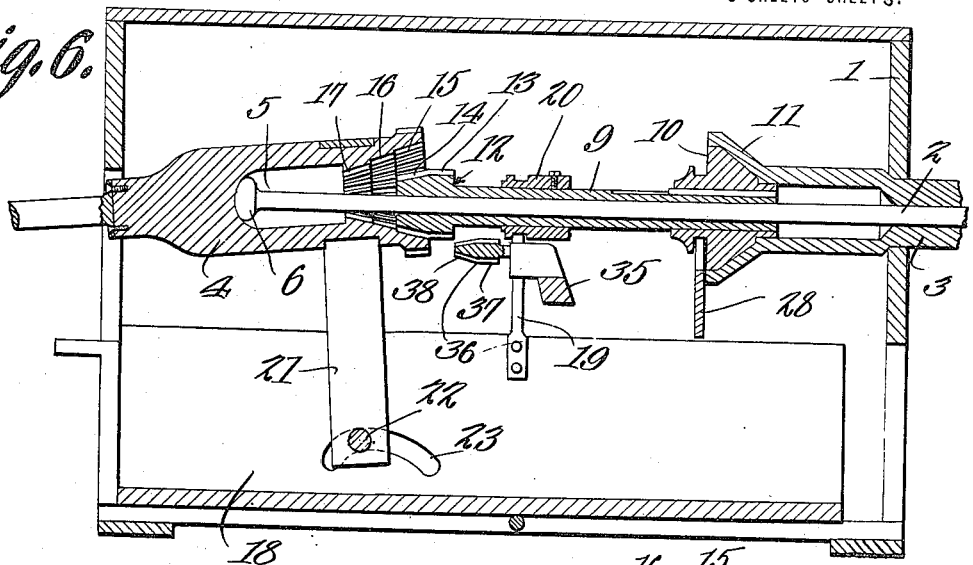
Fig. 6.
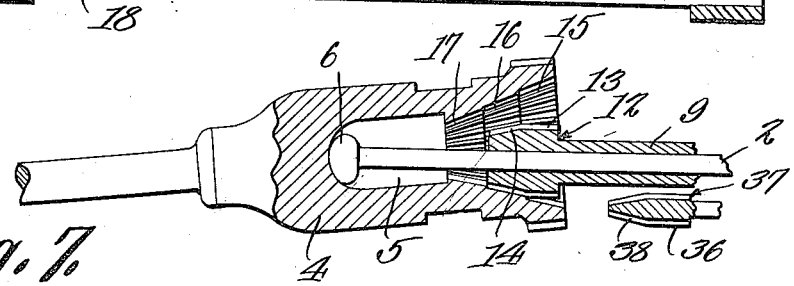
Fig. 7.
Fig. 8.
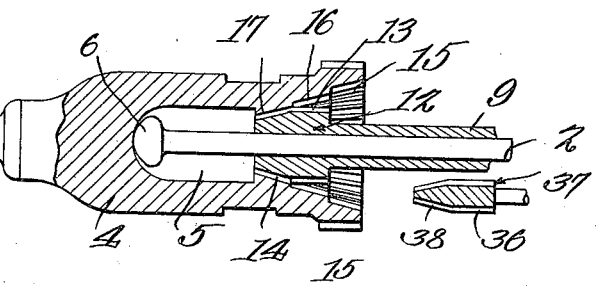
Fig. 9.
Witnesses
H. Maschek
Inventor
by
Attorneys.

UNITED STATES PATENT OFFICE.

HENRY MASCHEK, OF BEAUMONT, TEXAS, ASSIGNOR OF ONE-HALF TO BERT BORDERS, OF BEAUMONT, TEXAS.

VARIABLE-SPEED-TRANSMISSION GEARING.

1,155,597.   Specification of Letters Patent.   Patented Oct. 5, 1915.

Application filed May 22, 1915. Serial No. 29,867.

*To all whom it may concern:*

Be it known that I, HENRY MASCHEK, a citizen of the United States, residing at Beaumont, in the county of Jefferson and State of Texas, have invented a new and useful Variable-Speed-Transmission Gearing, of which the following is a specification.

The present invention appertains to a transmission gearing, and aims to provide a variable speed transmission gearing of novel and improved construction and operation, whereby several different forward and reverse speeds are attainable in a desirable and efficient manner.

The present gearing is adapted particularly for use on motor vehicles or automobiles although it may be employed in various capacities, and embodies a unique assemblage and coöperation of the component parts, for accomplishing the desired results, and whereby the construction is comparatively simple and inexpensive, as well as being thoroughly practical, efficient and convenient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
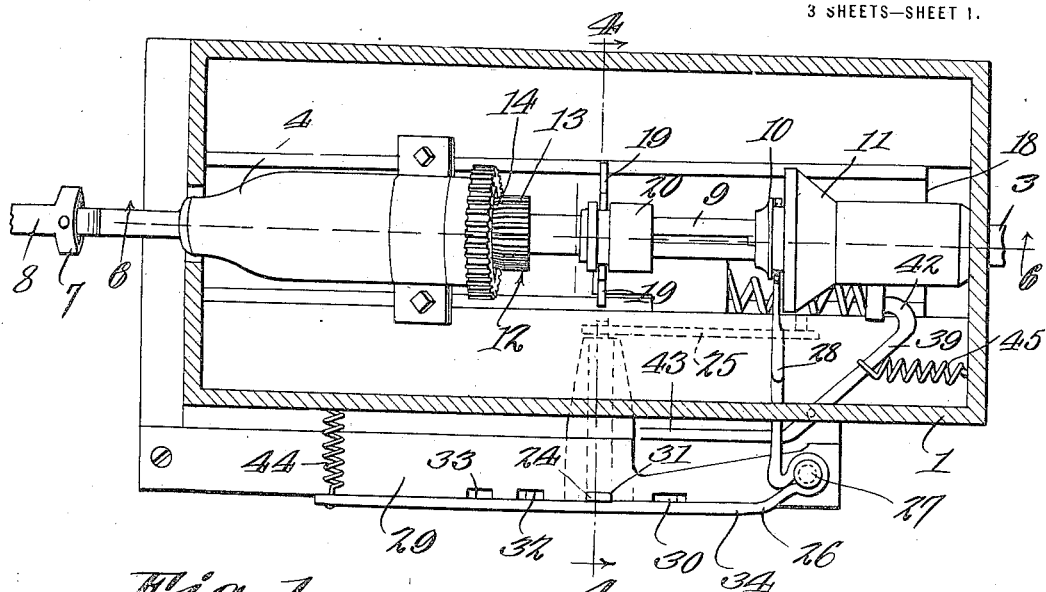
Figure 2:
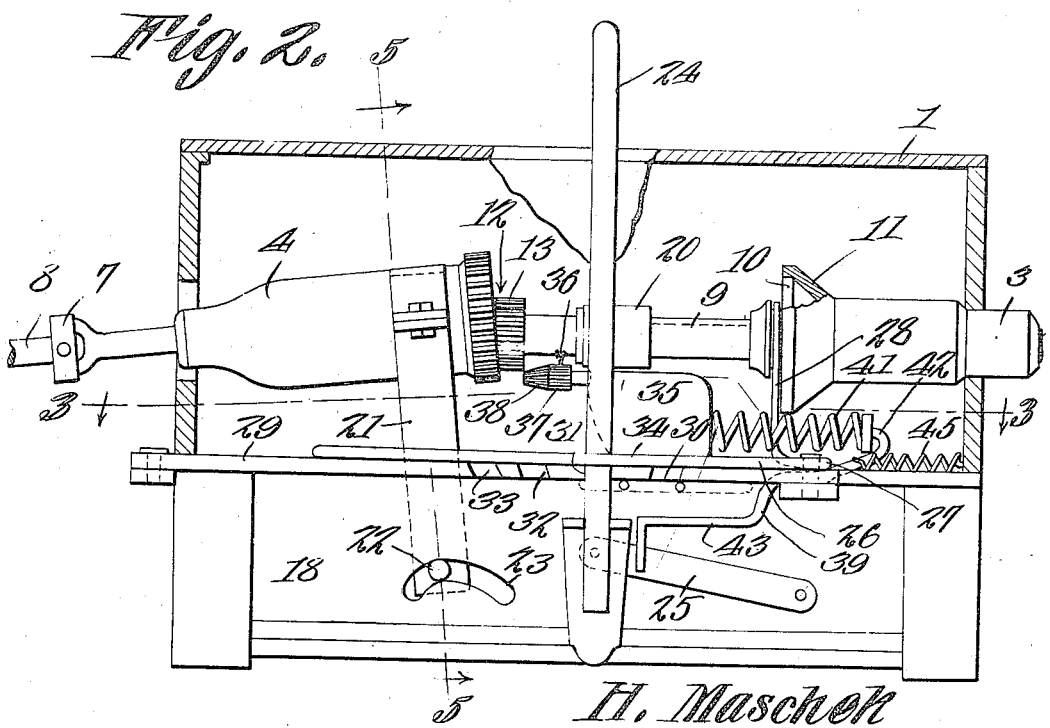

The invention is illustrated in the accompanying drawings, wherein:—Figure 1 is a plan view of the transmission gearing, portions being removed and broken away. Fig. 2 is a side elevation of the mechanism, portions being broken away. Fig. 3 is a horizontal section taken on the line 3—3 of Fig. 2. Fig. 4 is a cross section taken on the line 4—4 of Fig. 1. Fig. 5 is a cross section taken on the line 5—5 of Fig. 2. Fig. 6 is a longitudinal vertical section taken on the line 6—6 of Fig. 1. Figs. 7, 8 and 9 are sectional views illustrating various positions of the coöperating gears.

In carrying out the invention, there is provided a suitable frame or casing 1, into which the driving shaft 2 extends, and a sleeve 3 which is secured upon the longitudinal driving shaft 2 is journaled through one end of the frame 1.

An internal cup-shaped gear 4 is disposed adjacent the other end of the frame 1 and receives the corresponding end of the shaft 2, the gear 4 having a recess or socket 5 provided with a rounded end against which a knob or curved head 6 upon the respective end of the shaft 2 bears, to assist in holding the shaft 2 and gear 4 in operative position relative to one another, and whereby the gear 4 may oscillate and rotate relative to the shaft 2. The gear 4 is connected by a universal joint 7 or in any other suitable manner to the driven shaft or element 8.

A tubular shaft 9 is journaled for rotation upon the driving shaft 2 between the sleeve 3 and gear 4, and is provided at one end with a conical clutch member 10 adapted to be received by a flared clutch member 11 formed upon the inner end of the sleeve 3, whereby when the clutch members 10 and 11 are frictionally engaged to one another, the tubular shaft 9 will be rotated with the shaft 2. The other end of the shaft 9 is formed or provided with a gear 12, which has a cylindrical toothed portion 13 and a tapered or frusto-conical toothed portion 14.

The internal gear 4 is provided with a frusto-conical toothed portion 15 of relatively large diameter at the mouth thereof, and with a frusto-conical toothed portion 16 of smaller diameter next inside the toothed portion 15, and with a third frusto-conical toothed portion 17 of still smaller diameter next inside the toothed portion 16. The toothed portions 15, 16 and 17 are arranged in series, or one after the other, and there are but slight steps between the several toothed portions of the gear 4, whereby the gear 12 may be properly engaged from one toothed portion of the gear 4 to the other. The toothed portions 15 and 16 are of larger diameter that the gear 12, while the toothed portion 17 is of the same diameter as the toothed portion 14 of the gear 12 so as to snugly receive the same.

The actuating device of the gearing includes a longitudinal movable slide 18 carried by the frame 1 below the aforesaid parts, the slide 18 being preferably of U-shaped cross section, and upstanding arms 19 secured to the sides of the slide 18 have their upper or free ends engaged to a grooved collar 20 secured upon the tubular shaft 9 between the clutch member 10 and gear 12.

Thus, when the slide 18 is reciprocated, the shaft 9 will be reciprocated for shifting the gear 12 properly.

A standard 21 has its lower end received by the slide 18, and the gear 4 is journaled through the upper end of the standard 21. The lower end of the standard or pedestal 21 has a pin 22 working in arcuate slots 23 formed in the sides of the slide 18, whereby the gear 4 will be shifted laterally or vertically properly when the slide 18 is reciprocated.

As a means for manually operating or setting the slide 18, a hand lever 24 is fulcrumed to the lower portion of the frame 1 between the ends of the frame, and projects upwardly at one side of the frame. A link 25 connects the lever 24 and slide 18 so that when the lever is oscillated, the slide will be reciprocated.

The clutch member 10 is operated by a bell crank lever 26 which has its elbow portion fulcrumed, as at 27, to the frame, and one arm, designated 28, of the lever 26 is operatively engaged to a grooved portion of the clutch member 10, whereby when the lever 26 is oscillated, the clutch member 10 will be moved into and out of engagement with the clutch member 11.

The frame 1 has a horizontal bar 29 along which the hand lever 24 swings, and the bar 29 has a series of notches 30, 31, 32 and 33 into which the hand lever 24 springs by its tension. The hand lever 24 is resilient for this purpose, and normally springs into one of the said notches, so that it is necessary to manually swing the lever out of the respective notch before the lever can be swung for actuating the slide 18. The other arm 34 of the bell crank lever 26 extends along the notched edge of the bar 29, and the hand lever 31 is disposed between the bar 29 and the arm 24 of the lever 26. The arm 34 bears against the lever 26, whereby when the lever 26 is moved out of the respective notch of the bar 29, the arm 34 of the lever 26 will be forced outwardly, and this will so swing the lever 26 as to disengage the clutch member 10 from the clutch member 11. This arrangement is of advantage since it causes the clutch to be opened when the gears are shifted to a new position, as will hereinafter more fully appear.

A slide 35 is slidably carried by the slide 18 in any suitable manner, and a pinion 36 is rotatably carried by the slide 35 in any suitable manner, and projects toward the gear 4, adjacent, but behind, the gear 12. The pinion 36 has a cylindrical toothed portion 37, and a tapered or frusto-conical toothed portion 38. The toothed portion 37 of the pinion 36 is engageable with the toothed portion 13 of the gear 12, and the toothed portion 38 of the pinion 36 is engageable with the toothed portion 15 of the gear 4. The toothed portion 14 of the gear 12 is engageable with each of the toothed portions of the gear 4.

A lever 39, fulcrumed at 40 to the frame 1, is employed for shifting or advancing the slide 35 at the proper time, a coiled wire spring 41 being secured between the slide 35 and one arm 42 of the lever 39. The other arm 43 of the lever 39 has its free end coöperable with the hand lever 24 whereby when the hand lever 24 is swung from the slot 31 to the slot 30, the lever 39 will then be properly swung for advancing the slide 35.

Presupposing that the parts are arranged as illustrated in Figs. 1, 2 and 6, the gearing will be arranged in low or first speed forward. With the gears in low speed position, the toothed portion 14 of the gear 12 is intermeshed with the toothed portion 15 of the internal gear 4, and the slide 18 is held at proper position by the hand lever 24 which is received by the notch 31. When the slide 18 is in this position, the pin 22 will be raised by the slots 23 of the slide 18, to lift the standard or pedestal 21, and this will swing the gear 4 upwardly properly, so that the toothed portion 13 thereof will be engaged to the toothed portion 14 of the gear 12. When the lever 24 is received by the notch 31, the lever 26 will be swung under the influence of a spring 44 attached thereto, to swing the clutch member 10 into engagement with the clutch member 11 and the tubular shaft 9 will thus be rotated with the shaft 2. The gear 12 being rotated with the shaft 2 and engaging the gear 4, will cause the gear 4 to be rotated, but at a slower velocity than the shaft 2. The velocity between the driving and driven elements is thus of the proper ratio to propel the motor vehicle relatively slow. Ordinarily, the lever 39 remains stationary under the influence of a spring 45 attached to it, whereby the slide 35 is held back, to thereby hold the pinion 36 in retracted position out of engagement from the gears 12 and 4.

When a higher speed is desired, the hand lever 24 is first shifted outwardly or sidewise to remove it from the notch 31, and this will swing the lever 26 to open the clutch, since the clutch member 10 will be shifted out of engagement from the clutch member 11 and this will break the connection between the driving and driven elements. The lever 24 may then be swung into the notch 32, and this will move the slide 18 in the proper direction, to move the gear 12 farther into the internal gear 4, and at the same time, due to the interengaging portions of the standard 21 and slide 18, the standard 21 will be lowered slightly. This will result in the gear 4 being swung downwardly slightly, so that the gear 12 being moved into the gear 4, will cause the toothed portion 14 of the gear 12 to engage the toothed portion 16 of the gear 4, it being evident that when the gear 4 is swung downwardly, the toothed portion 15 thereof will be disengaged from the gear 12, while the gear 12 is shifted into engagement with the toothed portion 16 of the gear 4. When the hand lever 24 is released, it will spring into the notch 32, and this will allow the lever 26 to swing so as to bring the clutch member 10 into engagement with the clutch member 11, and the connection between the driving and driven elements will thereby be made. Since the toothed portion 16 is of smaller diameter than the toothed portion 15, the driven element will now be rotated at a higher velocity relative to the driving element. The clutch member 10 being feathered upon the shaft 9 will allow the shaft 9 to be slid longitudinally without disturbing the coöperation of the clutch members, it being evident that the shaft 9 is carried longitudinally with the slide 18.

When a still higher speed is desired, the lever 24 is disengaged from the notch 32, which will open the clutch as aforesaid, and the lever 24 is then swung adjacent the notch 33. The slide 18 is thus moved farther, so that the interengaging portions of the slide 18 and standard 21 will cause the standard 21 to be moved downwardly farther to bring the gear 4 into alinement with the shaft 2 and gear 12, and the slide 18 being moved will carry the shaft 9 therewith, so that the gear 12 will be moved still farther into the gear 4. As a result, the toothed portion 14 of the gear 12 will be received snugly by the toothed portion 17 of the gear 4, and the gear 4 will thus be rotated with the gear 12 and at the same velocity. Consequently, the driven element is rotated at the same velocity as the driving element. When the lever 24 is allowed to enter the notch 33, the clutch members are moved into engagement.

The low speed position of the gears is clearly illustrated in Fig. 6, and the second forward speed position of the gears is clearly depicted in Fig. 7, while the high speed position of the gears is shown in Fig. 8.

When it is desired to reverse the mechanism, so that the driven element is rotated in the opposite direction, the lever 24 after being disengaged from the respective notch, to disengage the clutch member 10 from the clutch member 11, is swung to the notch 30. When the lever 24 swings from the notch 31 to the notch 30, the lever 24 engages and pushes against the respective end of the lever 39 and forces said end of the lever 39 outward so that the spring 41 is brought under tension for moving the slide 35 toward the gear 4, and consequently the pinion 36 is brought into engagement with the gears 4 and 12. It is to be noted that end of the lever 39 which is engaged by the broad portion of the lever 24 is offset outwardly from the fulcrum of the lever 39, whereby the lever 24 in bearing against the arm 43 of the lever 39 will naturally tend to swing the arm 43 therewith, and will therefore force the arm 43 outward, said arm sliding along the horizontal or broad portion of the lever 24. Thus, as illustrated in Fig. 9, the pinion 36 is projected between the gears 4 and 12, so that the cylindrical toothed portion 37 of the pinion 36 intermeshes with the cylindrical toothed portion 13 of the gear 12, while the frusto-conical toothed portion 38 of the pinion 36 intermeshes with the toothed portion 15 of the gear 4. The pinion 36 being thus disposed between the two gears, will cause the gear 4 to be rotated in the reverse direction. It is evident that when the lever 24 is received by the notch 30, the clutch members are again brought into engagement with one another, for making the connection between the driving and driven elements.

Having thus described the invention, what is claimed as new is:

1. In a transmission gearing, an internal gear having a recess provided with a rounded end and having a plurality of toothed portions of various diameters, a shaft entering said recess and having a rounded end bearing against the end of said recess, a gear slidable upon said shaft into and out of the internal gear and having a toothed portion to engage the toothed portions of the internal gear, means for sliding the second mentioned gear upon the shaft, and means for swinging the internal gear and shaft relative to one another whereby the toothed portions of the two gears are brought into and out of engagement.

2. In a transmission gearing, an internal gear having a recess provided with a rounded end and a plurality of toothed portions of various diameters, a shaft projecting into said recess and having a rounded end bearing against the rounded end of said recess, a gear slidable upon the shaft and engageable with said toothed portions, means for shifting the second mentioned gear along the shaft, means for swinging the shaft and internal gear relative to one another to bring the gears into and out of engagement, a pinion adapted to be projected between said gears when said gears are separated properly, and means for moving the pinion into and out of engagement with said gears.

3. In a transmission gear, a pair of coöperable clutch members, a gear shifting lever, a bar having notches for normally receiving said lever, and a lever operatively connected to one clutch member and coöperating with the aforesaid lever, whereby when the first mentioned lever is moved out of the notches, it will swing the second mentioned lever to disengage the clutch members.

4. In a transmission gearing, an internal gear having a plurality of toothed portions of various diameters, a shaft, a tubular shaft journaled upon said shaft and having a gear engageable with said toothed portions of the internal gear, a clutch member feathered upon the tubular shaft, a coöperating clutch member carried by the first mentioned shaft, operating means operatively connected to said tubular shaft and internal gear for shifting the tubular shaft longitudinally and for swinging the internal gear and first mentioned shaft relative to one another whereby the two gears are properly brought into and out of engagement, and means operated by said operating means when the operating means is actuated for shifting said gears from one position to another, for releasing the first mentioned clutch member from the other clutch member.

5. In a transmission gearing, an internal gear having a plurality of toothed portions of various diameters, a shaft, a tubular shaft slidable thereon and having a gear engageable with said toothed portions, a slide having an operative connection with said tubular shaft, whereby the tubular shaft is moved with the slide, a pedestal carrying the internal gear, the pedestal and slide having interengageable means whereby the internal gear is swung relative to the first mentioned shaft when the slide is moved, and means for moving the slide.

6. In a transmission gearing, an internal gear having a plurality of toothed portions of various diameters, a shaft, a tubular shaft slidable thereon and having a gear engageable with said toothed portions, a slide having an operative connection with said tubular shaft, whereby the tubular shaft is moved with the slide, a pedestal carrying the internal gear, the pedestal and slide having interengageable means whereby the internal gear is swung relative to the first mentioned shaft when the slide is moved, a lever for actuating the slide, a second slide, a pinion carried by the second slide and adapted to be projected between and into engagement with said gears when the gears are separated properly, and means operated by said lever and operatively connected to the second slide whereby when the lever is moved for separating the gears as above indicated, the pinion will be projected into engagement with the gears.

7. In a transmission gearing, an internal gear having a plurality of toothed portions of various diameters, a shaft, a tubular shaft journaled thereon and having a gear engageable with said toothed portions, a clutch member feathered upon the tubular shaft, a coöperating clutch member carried by the first mentioned shaft, a slide having means connected to the tubular shaft for moving the tubular shaft with the slide, a pedestal carrying the internal gear, the pedestal and slide having interengageable means whereby the internal gear is swung relative to the first mentioned shaft when the slide is moved, a hand lever for moving the slide, a bar having notches for normally receiving the hand lever when the gears are engaged to one another, a second lever operatively connected to the first mentioned clutch member and coöperating with the first mentioned lever, whereby when the first mentioned lever is moved out of the notches, the first mentioned clutch member is released from the other clutch member, a second slide, a pinion carried by the second slide and projectable between and engageable with the aforesaid gears when the gears are separated properly, and means operated by the first mentioned lever when said lever is swung for separating the gears as above indicated whereby the second slide is moved to project said pinion into engagement with the gears.

In testimony that I claim the foregoing as my own, I have hereto affixed my signature in the presence of two witnesses.

HENRY MASCHEK.

Witnesses:
M. S. DUFFIE,
J. M. REAGAN.